Oct. 15, 1929.　　　C. P. EISENHAUER　　　1,731,526
AUTOMATIC WATER SOFTENER
Filed Oct. 12, 1925　　13 Sheets-Sheet 1

Fig.1.

CHARLES P. EISENHAUER,
By Toulmin & Toulmin,
Attorneys

Oct. 15, 1929.  C. P. EISENHAUER  1,731,526
AUTOMATIC WATER SOFTENER
Filed Oct. 12, 1925  13 Sheets-Sheet 2

Inventor
CHARLES P. EISENHAUER,
By Taulmin Taulmin,
Attorneys

Oct. 15, 1929.  C. P. EISENHAUER  1,731,526
AUTOMATIC WATER SOFTENER
Filed Oct. 12, 1925  13 Sheets-Sheet 3

Fig. 3.

Inventor
CHARLES P. EISENHAUER,
By Toulmin & Toulmin,
Attorneys

Oct. 15, 1929.  C. P. EISENHAUER  1,731,526
AUTOMATIC WATER SOFTENER
Filed Oct. 12, 1925  13 Sheets-Sheet 6

Inventor
CHARLES P. EISENHAUER,
By Toulmin & Toulmin,
Attorneys

Oct. 15, 1929.　　　C. P. EISENHAUER　　　1,731,526
AUTOMATIC WATER SOFTENER
Filed Oct. 12, 1925　　　13 Sheets-Sheet 7

Inventor
CHARLES P. EISENHAUER,
By Toulmin & Toulmin,
Attorneys

Oct. 15, 1929.   C. P. EISENHAUER   1,731,526
AUTOMATIC WATER SOFTENER
Filed Oct. 12, 1925   13 Sheets-Sheet 13

Fig. 22.

Inventor
CHARLES P. EISENHAUER,
By Toulmin & Toulmin,
Attorneys

Patented Oct. 15, 1929

1,731,526

UNITED STATES PATENT OFFICE

CHARLES P. EISENHAUER, OF DAYTON, OHIO, ASSIGNOR TO THE DURO COMPANY, OF DAYTON, OHIO, A CORPORATION OF OHIO

AUTOMATIC WATER SOFTENER

Application filed October 12, 1925. Serial No. 61,996.

My invention relates to water softeners and in particular to an automatic softener.

It is the object of my invention to provide an automatic water softener, in which the periods of softening and regeneration are controlled by the amount of water passing through the system.

In particular, it is my object to provide an improvement in water softeners, by providing certain assembly of the essential elements of the system in unit parts to facilitate operation and manufacture, and to produce improved results.

It is my object to provide a unit structure of the meter, softening and drain valves closely associated with the meter control mechanism, and to provide a unit for controlling the regeneration, including the refill valve and brine valve.

Figure 1:
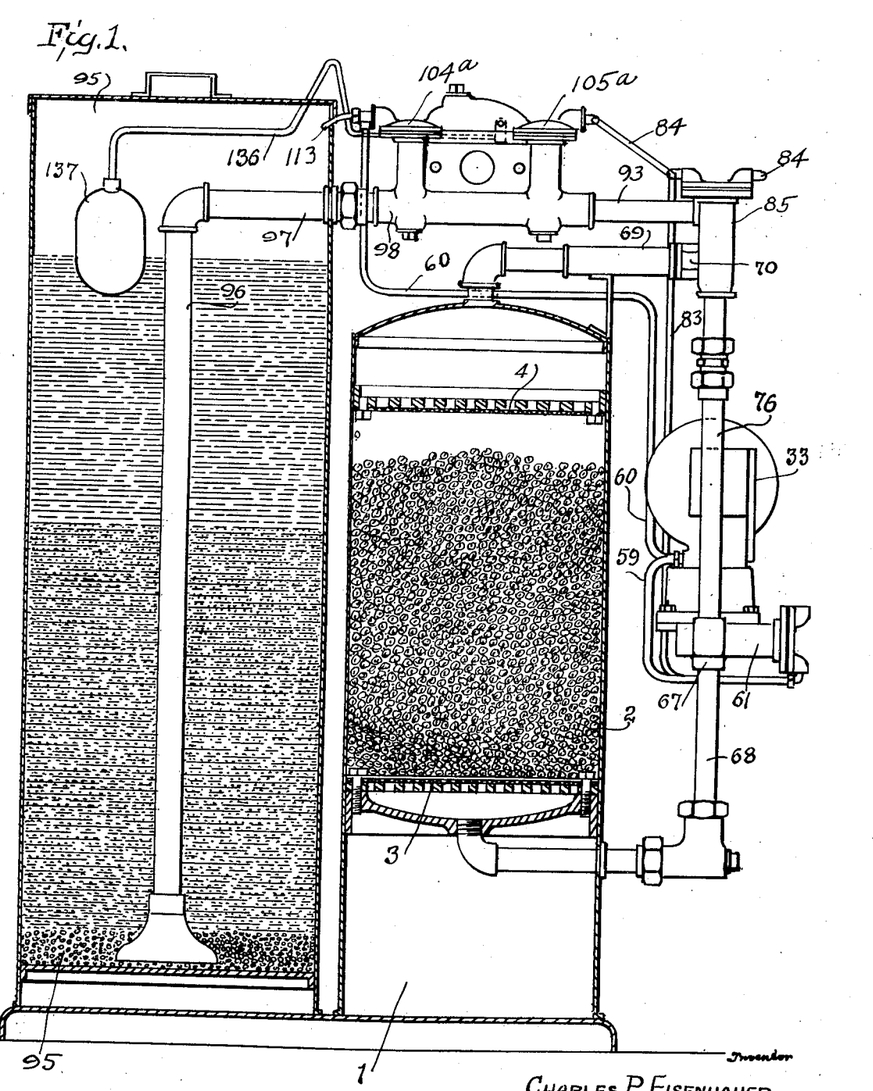
Figure 1 is an elevation of the complete apparatus.

In Figure 1 there is shown a tank 1, which has therein softening material 2 supported by a lower screen 3 and an upper screen 4.

Figure 3:
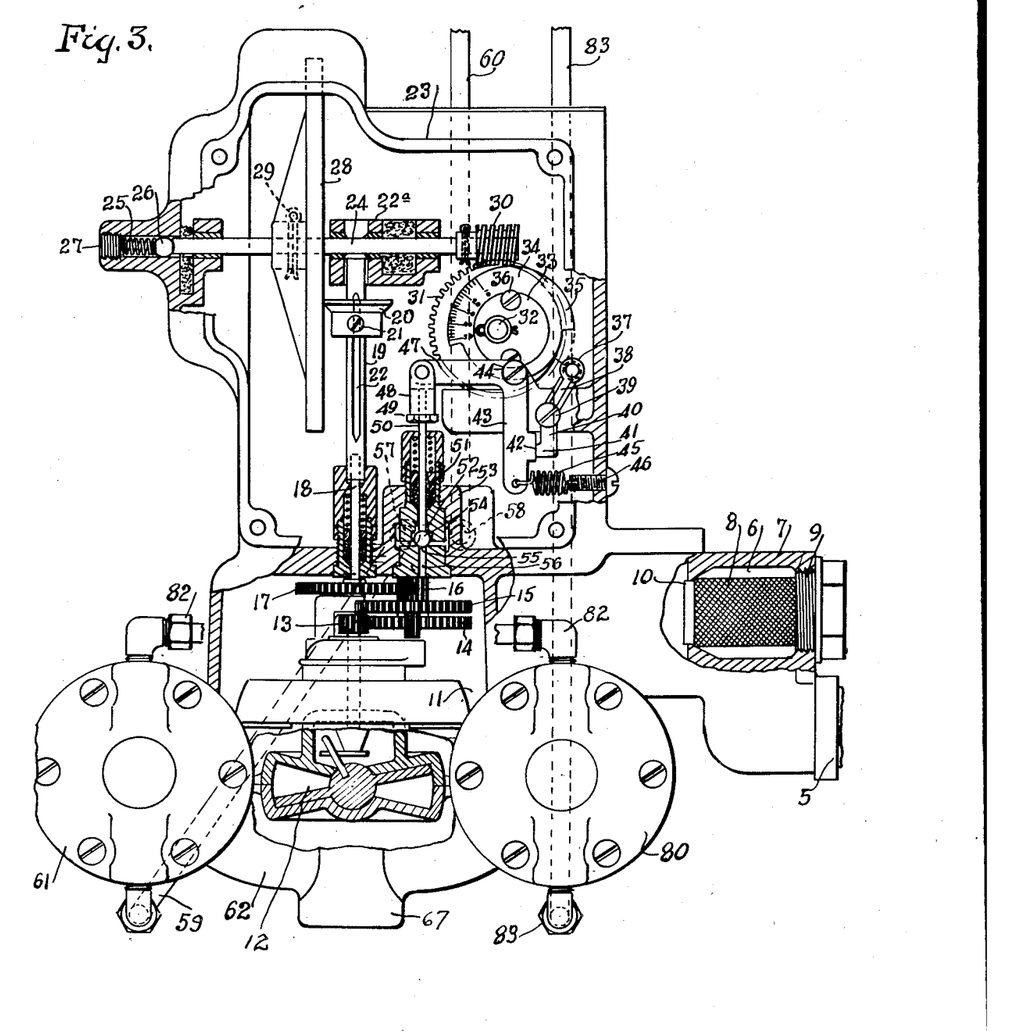
Figure 3 is a section through the meter casing and meter controlling mechanism casing showing the main needle valve control and attending apparatus.
Figures 4, 6, 8:
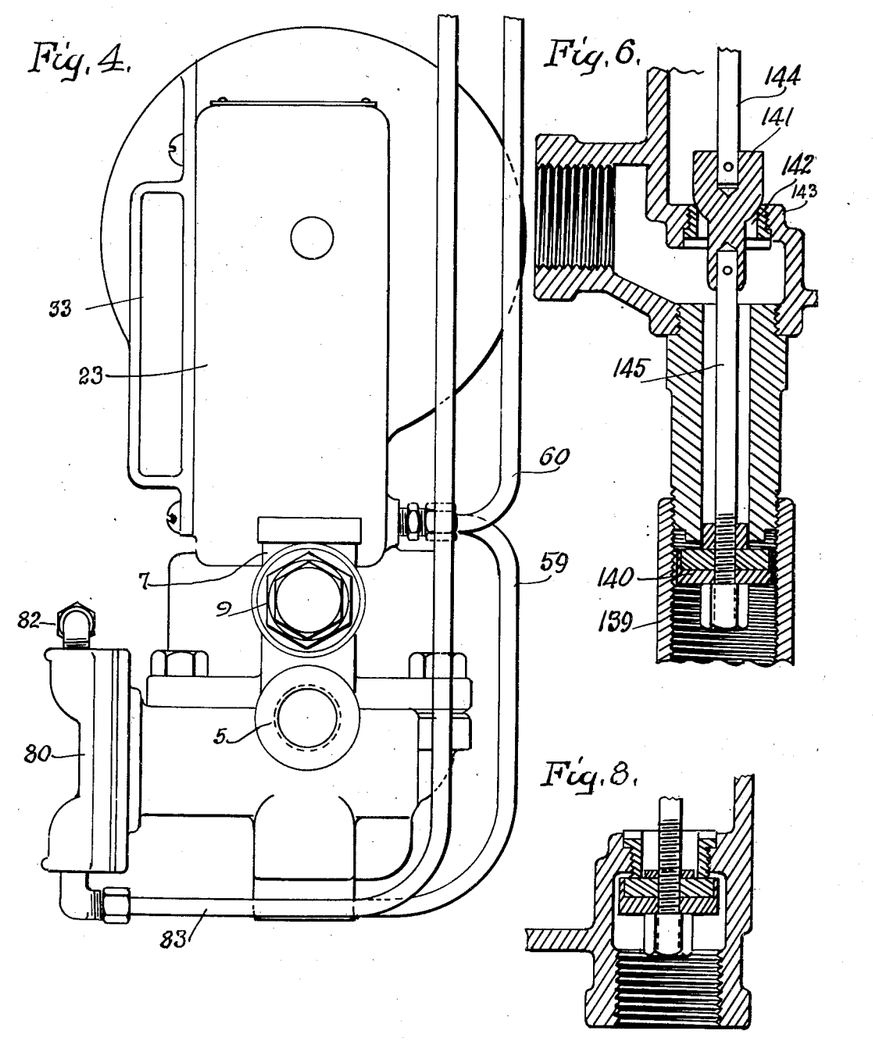
Figure 4 is an end elevation thereof.
Figure 6 is a section through the by-pass valve mechanism.
Figure 8 is a section through the regeneration valve.

In Figure 3 there is shown a hard water inlet pipe 5. The hard water from pipe 5 passes into a chamber 6 formed by a casing 7, which has a screw threaded opening closed by a plug 9, which carries a cylindrical screen 8. The water passes into the chamber 6, circulates around the screen 8 and enters and passes out through an opening 10 at the inner end of the chamber and enters a meter chamber 11 formed in a detachable bottom. In the meter chamber there is located a meter actuator 12, which operates a series of gears 13, 14, 15, 16 and 17. These gears are for the purpose of operating a vertical shaft 18, which is attached to and operated by the gear 17. This shaft 18 is suitably supported in the framework that forms part of the housing for the mechanism that controls the operation of the different valves. This housing is indicated by the numeral 23.

Extending upwardly from the vertical shaft 18 and attached thereto is a larger and heavier shaft 19, which is pivoted at its upper end and carries a friction roller 20, which is adjustably attached to the shaft 19 by means of a screw 21 fitting in a slot 22 in the shaft 19. The upper end of the shaft 19 is journalled in a bracket 22ᵃ extending from the housing 23.

Journalled in the housing 23 is a shaft 24 supported near one end by the bracket 22ᵃ and at the other end by a bearing formed in the wall of the housing 23. The bearing in the wall of the housing is closed at one end by a screw and has therein a spring 25, which presses against a ball 26 against which the end of the shaft 24 engages and rotates. The spring is held in the housing and in contact with the ball 26 by means of a screw 27. By means of this screw 27 the tension of the spring may be increased or diminished so that the frictional contact between the roller 20 and the disk 28 may be varied.

Located near the middle of the shaft 24 is a driven disk 28 held on the shaft by means of a cotter pin 29 and in contact with the roller 20 so that the disk is rotated by the rotation of the roller. On the extreme inner end of this shaft 24 is a worm 30 which engages and meshes with a worm wheel 31 mounted on a shaft 32, which carries an eccentric disk 33. On this disk 33 is a cam ring 34 cooperating with another cam ring 35, carried on the shaft 32. These cams may be adjusted in relation to each other and to the eccentric 33, and held in adjusted position by means of screw 36 to vary the length of the cam surface that engages the roller 37.

These cams are adapted to engage with a follower or roller 37, carried by a bell crank consisting of an arm 38 pivoted at 39 on housing 23, and having extending therefrom an arm 40 provided with a head 41 adapted to ride against a head 42 on one arm of a bell crank lever 43 pivoted on a part of the housing 23 at 44. By adjusting the cam ring 34 and the cam ring 35 the length of the cam may be reduced or extended and the consequent operation of arm 38 varied and the opening of the valve, to be hereafter described, determined.

For the purpose of holding the head 42 in engagement with head 41 there is provided a spring 45 attached at one end to the lower end of the arm 43, and at the other end to a screw 46 in one wall of the housing 23. Extending from the pivot 44 and at right angles to the arm 43, is an arm 47 pivoted at its outer end to a link 48 adjustably connected by a nut 49 to a needle valve stem 50.

Figure 5:
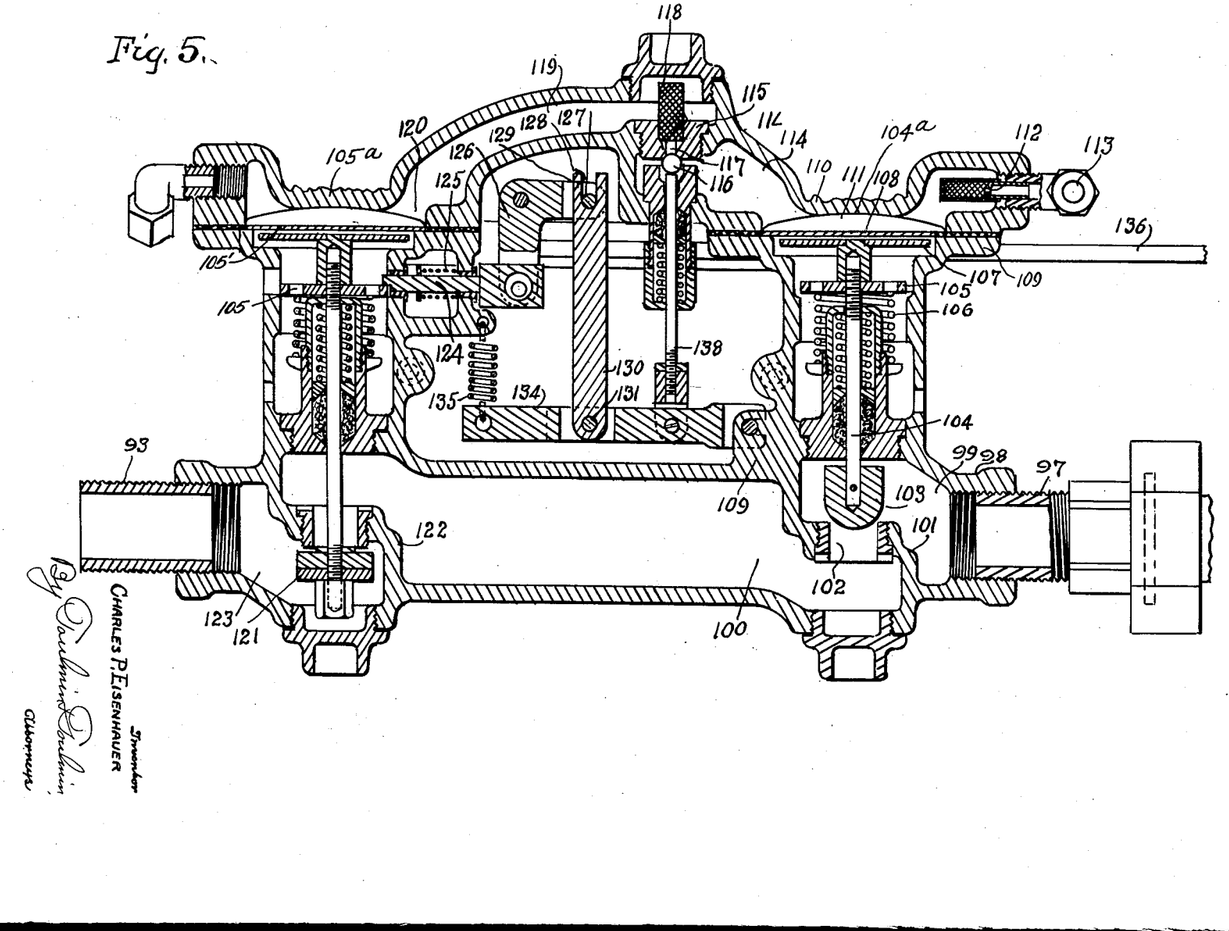
Figure 5 is a section through the unit, comprising a refill valve, brine valve, float arm and float for the brine tank.

This stem 50 is vertically located and extends through a spring-pressed packing member 51 into a chamber 52 within a casing 53. The valve stem 50 has on the lower end thereof a needle ball valve 54 adapted to close an opening 55 of the passageway 56, which leads from the meter chamber through passageways 57 and 58, and connects to two pipes 59 and 60. The pipe 59 conveys liquid from the meter chamber to the softening valve 61 for the purpose of operating the valve to close it. The pipe 60 is a pressure relief pipe, and leads to the brine overflow 113, as shown in Figure 5. The bleed is restricted and acts to relieve the pressure from the valve 61 when the ball 54 is seated for the purpose of shutting off the water from the meter chamber.

Figure 15:
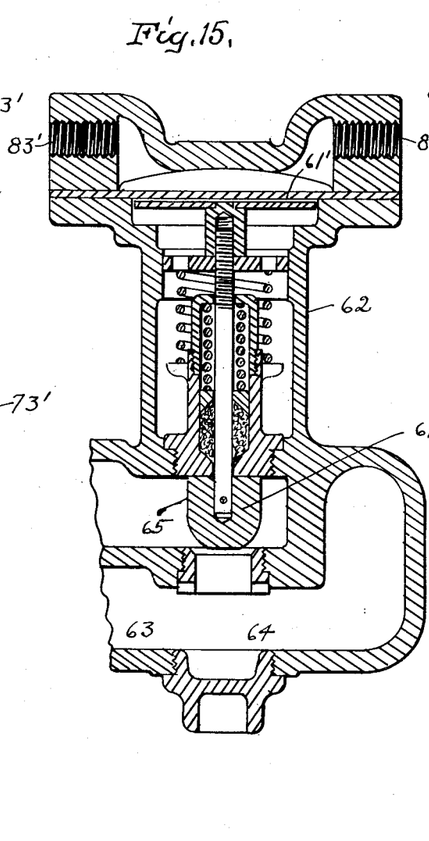
Figure 15 is a section through the softening valve mechanism.
Figure 16:
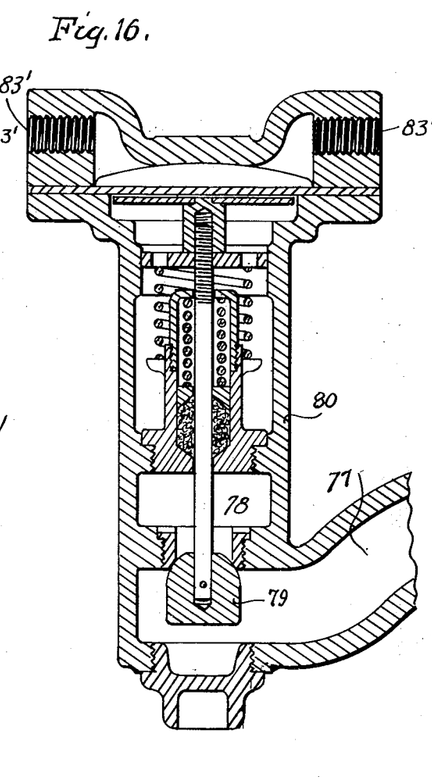
Figure 16 is a section through the drain valve mechanism.

The pipe 59 leads to the softening valve 61, where it enters behind the diaphragm 61′, as shown in Figure 15. The valve 61 is normally open, as shown by this figure, but when the water is admitted through pipe 59 behind the diaphragm 61′ the valve is closed, due to pressure on the diaphragm. This valve is located on one side, near the bottom of the housing, and adjacent the meter casing, and in a casing indicated by the numeral 62.

Figures 2, 9, 10:
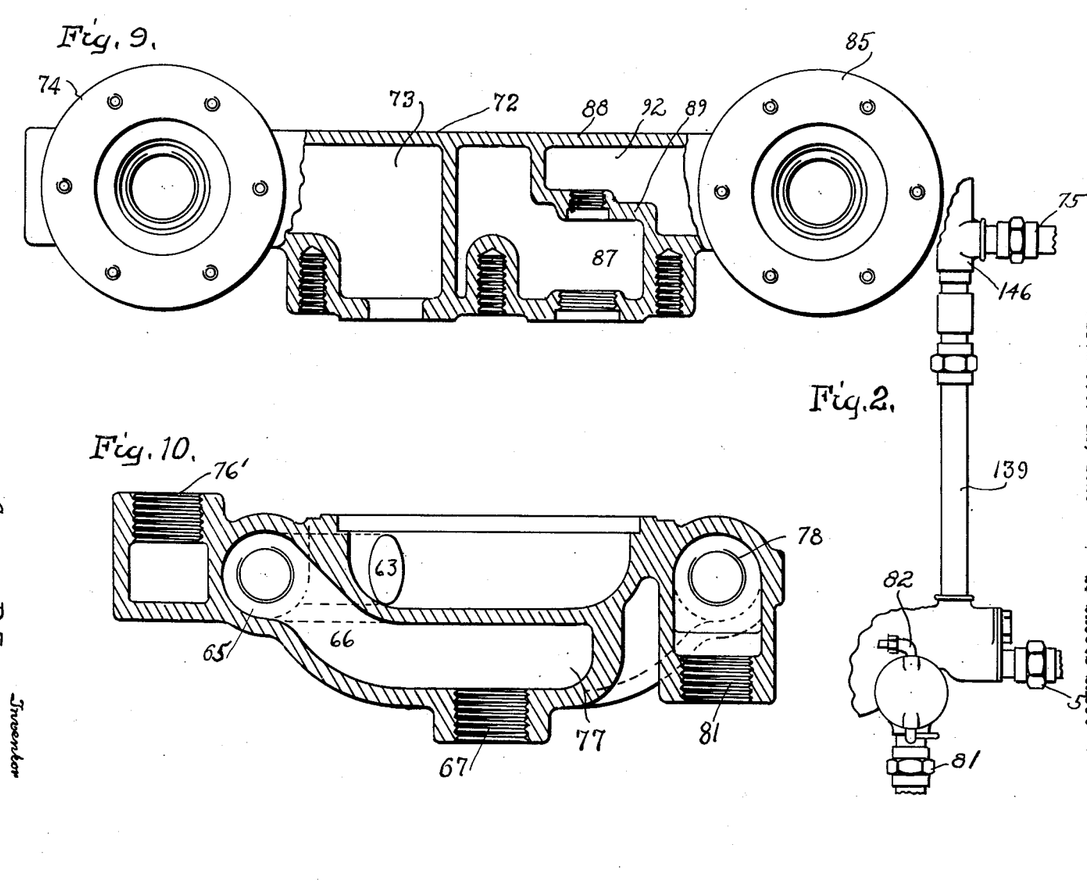
Figure 2 is a detail view of the arrangement of the drain valve, by-pass valve and hard water, by-pass line.
Figure 9 is a transverse section through the casing connecting the house service valve and regeneration valve.
Figure 10 is a section through the bottom of the meter casing on the line 10—10 of Figure 11.
Figures 7, 13:
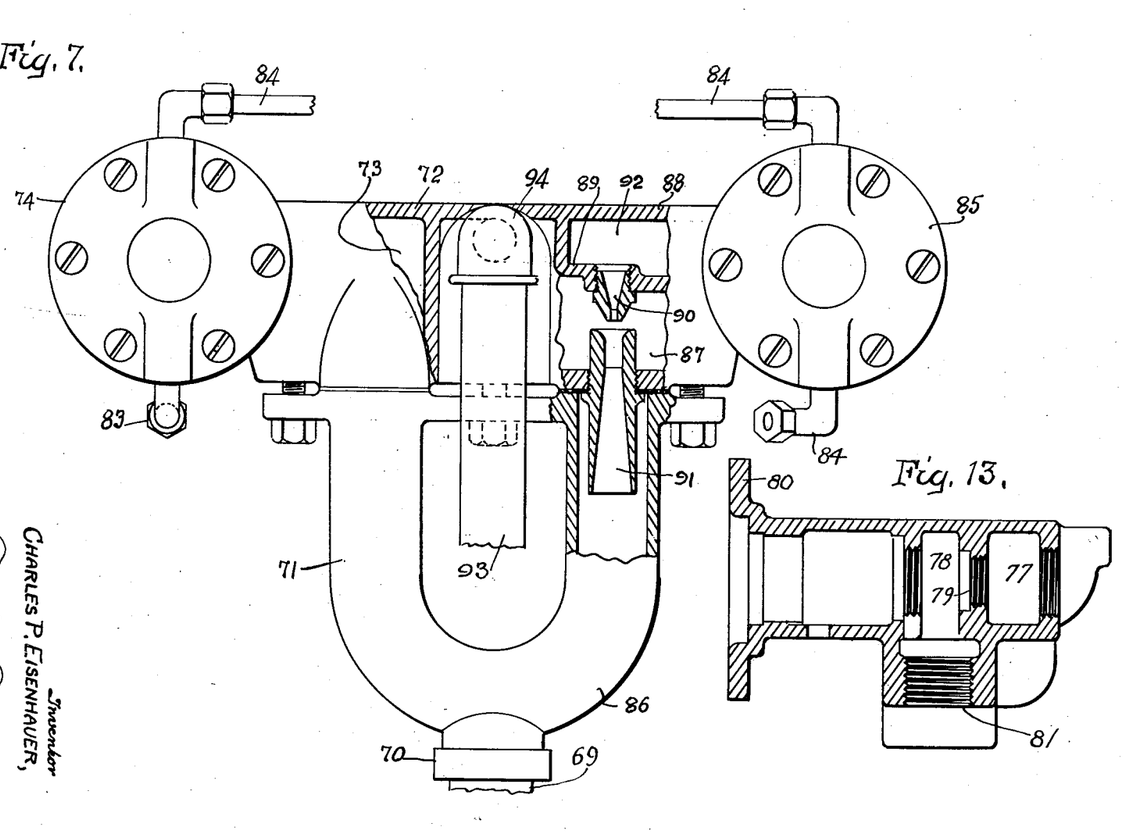
Figure 7 is a plan view of the regeneration valve, house service valve, feed lines for brine and water, showing the injector mechanism in section.
Figure 13 is a section on the line 13—13 of Figure 11.
Figure 11:
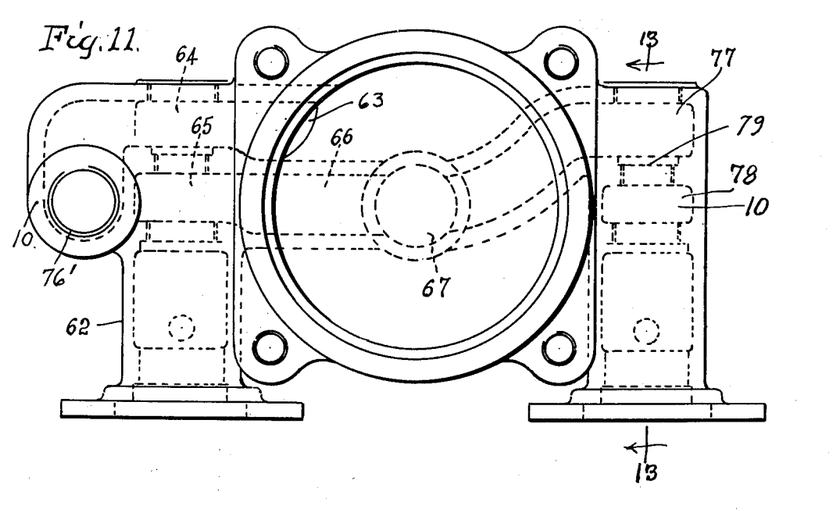
Figure 11 is a plan view of the meter casing.
Figure 12:
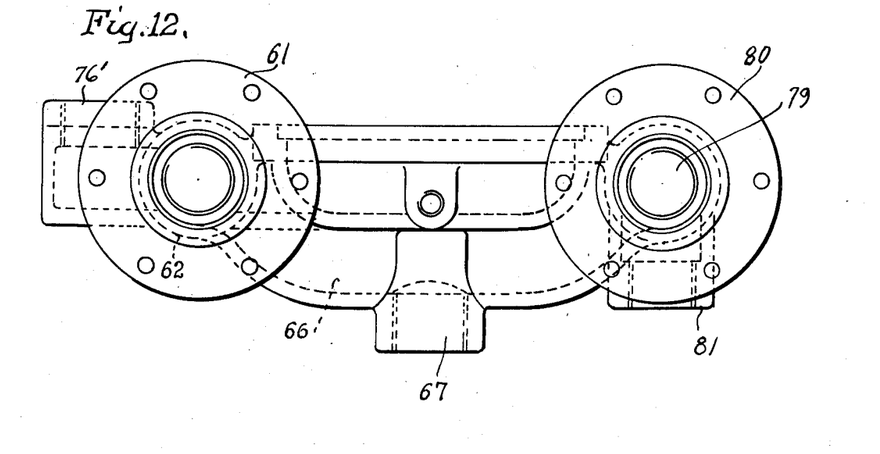
Figure 12 is a front elevation of the bottom of the meter casing.
Figure 17:
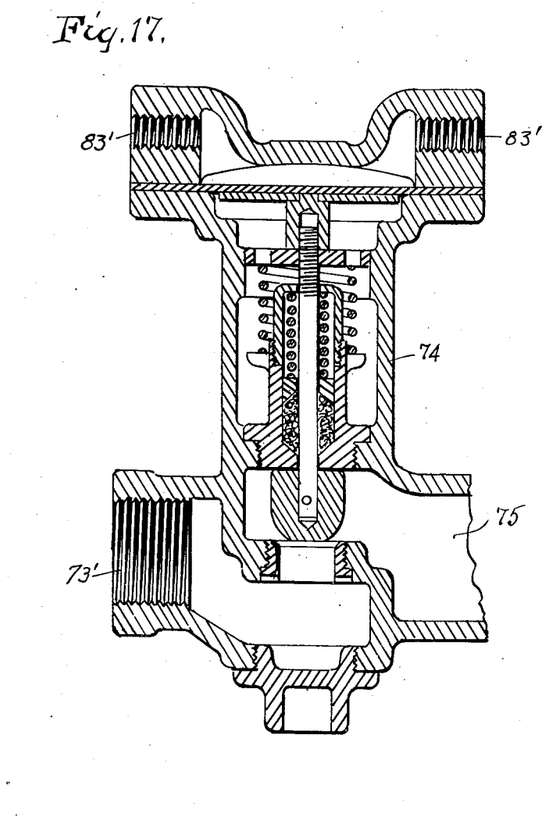
Figure 17 is a section through the household service valve.
Figure 18:
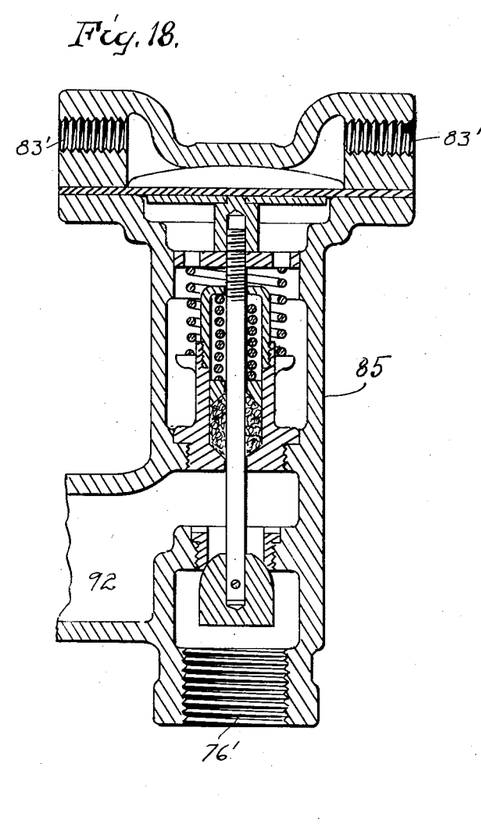
Figure 18 is a section through the regeneration valve.
Figure 19:
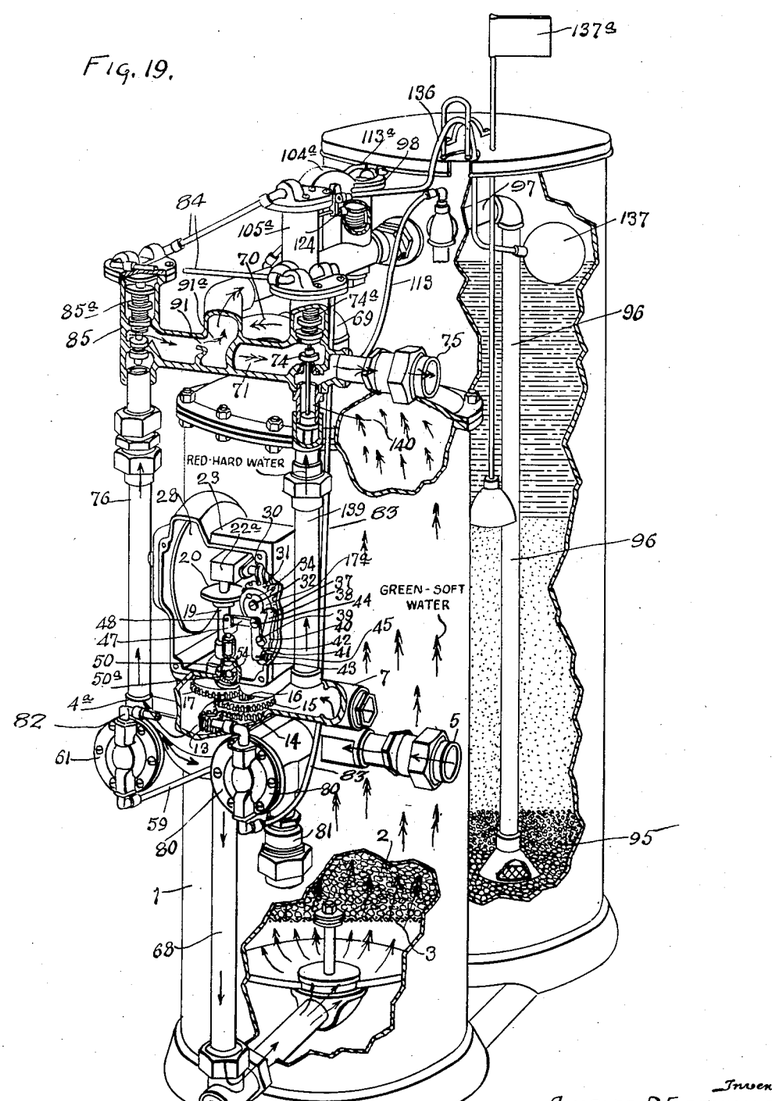
Figure 19 is an elevation, partly in section, of the assembled softening apparatus, the structure being shown in "softening position".
Figure 20:
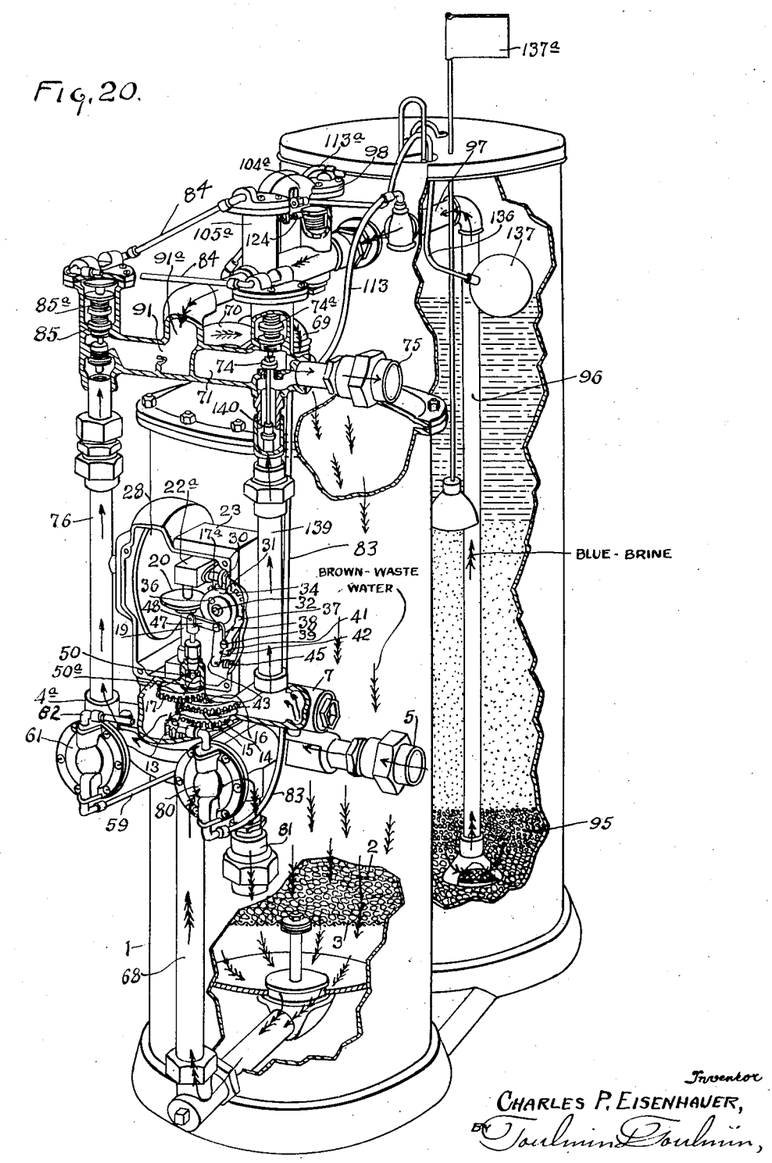
Figure 20 is a view similar to Figure 19, showing the apparatus in the first regenerating position.
Figure 21:
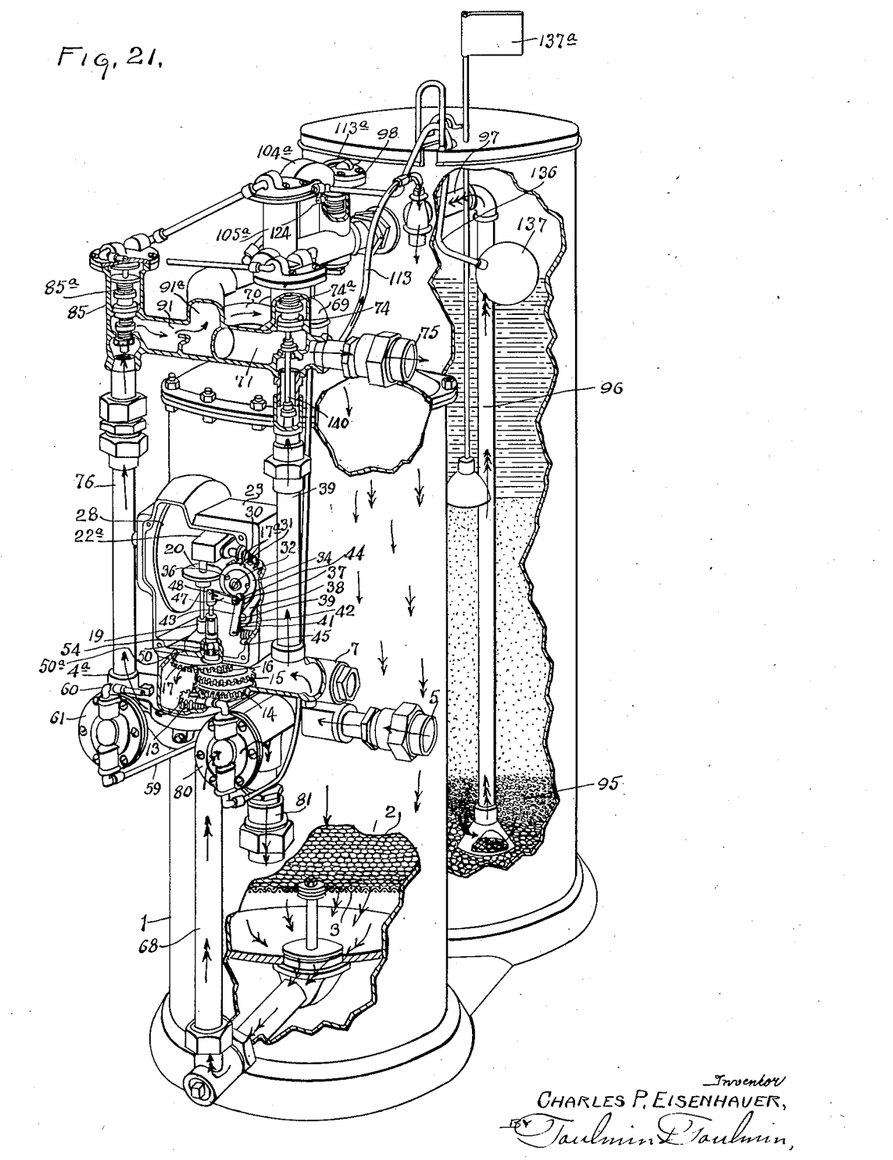
Figure 21 is a view similar to Figures 19 and 20, showing the apparatus in the second regenerating position.
Figure 22:
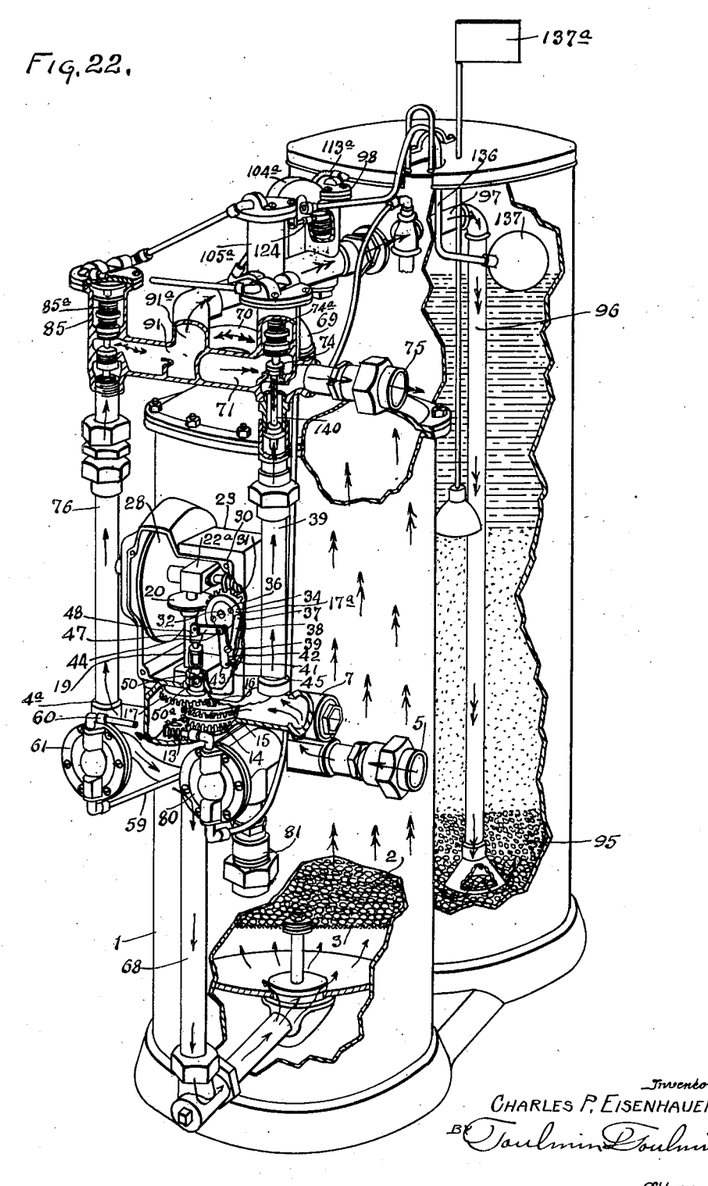
Figure 22 shows a view similar to Figures 19, 20 and 21, showing the apparatus in the refill position.

The water from the meter casing passes through an opening 63 (Figures 10, 11 and 15), thence through a passageway 64 into a chamber 65 controlled by the softening valve 61, normally open and in softening position, into a passageway 66 in the bottom of the meter casing and downwardly through an opening 67 to a pipe 68 which leads to the bottom of the tank 1, up through the minerals therein, where it is softened, and out through pipe 69 to the mouth 70 of the U-shaped pipe shown in Figure 7. From the mouth 70 the water passes through a branch 71 of the U-shaped pipe into a casing 72, which has a chamber 73 therein connected to the valve 74 at 73′. This valve is shown in Figure 17. This valve 74, normally open during the softening process, as shown in this figure, admits the water from the chamber 73 through the valve into pipe 75, which is a household pipe. The water cannot enter the brine tank because the brine valve 122 is closed, the brine tank being full.

Figure 14:
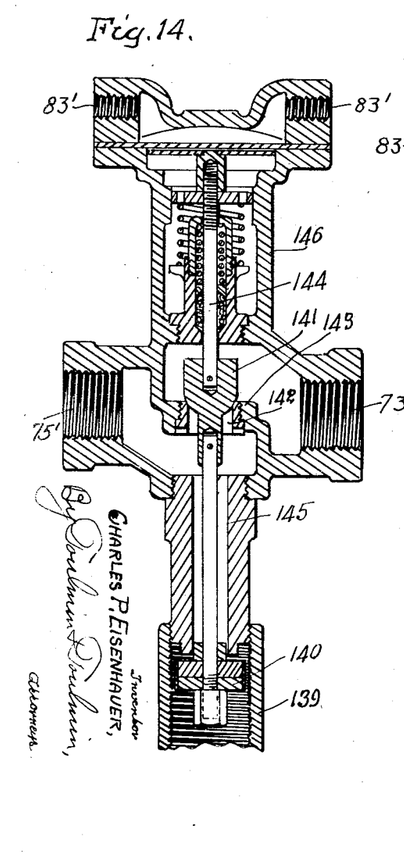
Figure 14 is a section through the by-pass valve mechanism.

The valve structures shown in Figures 14 and 17 are the same and for the same purpose, with the exception that in Figure 14 the by-pass valve is shown in connection with the service valve.

During the time that the ball valve 54 is seated there is no pressure on the valve diaphragms of either of the valves 61 or 74 and as a consequence the water passes from the inlet pipe 5 through the meter, the valve 61 down through pipe 68, up through tank 1, out through pipe 69, through branch 71, chamber 73, through valve 74 to the service pipe 75. While the water is taking this course the meter is being operated and rotates the cams 34 and 35 to operate the bell cranks to open the valve 54. When the cams are sufficiently rotated these bell cranks are operated and the valve 54 is open, the water then passes from the meter casing through pipe 59 to close the valve 61 so that the water is prevented from passing from the meter casing down through opening 67, but is diverted and forced by the valve 61 into pipe 76.

During the time that the softening operation just described is taking place, the valve 80 is closed so that no water can pass from the meter chamber out through the waste pipe, but must go through the softening valve 61, the tank, pipe 69 and the service valve 74 to the service pipe 75. During this course of the operation the drain valve 80 and the regenerating valve 85 are normally closed so that it is impossible for water to take any other direction than that described for the purpose of regeneration and household service.

After the ball valve has been operated for the admission of water into the valve 61 behind the diaphragm 61' to close the valve 61, the water is also admitted from the valve 61 through pipe 82 to the valve 80 for the purpose of operating valve 80, which is normally closed, to open this valve for drain purposes. The pressure water entering valve 80 from pipe 82 leaves through pipe 83, which goes up to valve 74 and behind the valve diaphragm 74' for the purpose of closing the service valve and to cut off the water from the service pipe, and opening the by-pass valve 140. See Figure 14. This same water that operates the valves 74 and 140 passes through pipe 84 into the valve 85 and behind the diaphragm 85' for the purpose of opening this valve 85, which is the regeneration valve and is normally closed.

This same valve-operating water that has just opened valve 85 passes onto the refill valve 105ª through a pipe 84. The refill valve is shown in Figure 5, and is closed under normal softening conditions. But when the ball valve is operated to open the valve the pressure is admitted through pipe 84 behind the diaphragm 105' for the purpose of opening this refill valve. This valve is shown on the lefthand side of Figure 5, while on the righthand side thereof there is shown the brine valve, which is normally open and remains open until regeneration action has taken place, until the valve 116 is opened, as will be described later on.

While the parts are in the position just described the valves 61 and 74 are closed so that the water cannot pass out through pipe 67 from the meter chamber but must pass up through pipe 76 into valve 85, which though normally closed is now open, through which the water passes into chamber 92, as shown in Figure 7. From chamber 92 the water passes through a restricted opening 90 into the injector opening 91, into branch 86 of the U-shaped pipe, through the opening 70, pipe 69, into the upper part of the tank 1.

While the water is thus being directed as it passes through the opening 90, it creates a suction and injection action on the contents of the chamber 87, to which the pipe 93 is attached. The pipe 93 extends through the refill valve and the brine valve structure. Both valves 103, the brine valve, and the refill valve 105ª being open, the injection action in the chamber 87 draws the brine from the brine tank 95 through pipe 97, through brine valve 103, which is now open, through the refill valve 121, now open, through pipe 93 into chamber 87, through the injector 91, through pipes 86, 69, down through tank 1 for regenerating purposes.

After leaving the tank 1 the water passes up through pipe 68, opening 67, passageway 77, chamber 78, out through valve 80 and down through drain pipe 81 into the sewer. See Figures 1 and 10. This action is the regeneration action and continues until the brine has been reduced to a point where the float 137 has been sufficiently lowered to operate the shaft 136 connected to the bell crank lever 126 to open valve 116 to admit water behind diaphragm 108 to close valve 103 and shut off the brine.

Figure 5 shows a view in section of the refill valve and the brine valve. The casing that incloses these valves and their related structures, is connected on one side to pipe 97 which leads to the brine tank, and on the other side to pipe 93, which leads to a casing connected to the injector.

The pipe 97 is attached to a casing 98 which leads into a chamber 99. This chamber 99 is separated from a tubular chamber 100 by means of a partition 101 which has an opening therein 102, which acts as a valve seat to receive the valve 103. From the valve 103 extends a valve stem 104 which has on its upper end, the end remote from the valve, a shoulder 105 which is engaged by spring 106, normally holding the valve in open or unseated position. This structure represents the brine valve and is indicated as a whole by the numeral 104ª.

The structure, as far as the valve stem, the spring and the shoulder are concerned, is the same as that in the refill valve shown in the lefthand part of this figure. The refill valve generally is indicated by the numeral 105ª, and has a diaphragm 105' for the purpose of operating the refill valve by pressure. On the upper part of the shoulder 105 and on the extreme upper end of the valve stem 104 is a plate 107 resting just beneath the diaphragm 108 of the brine valve.

The casing that incloses the upper part of the brine valve is indicated by the numeral 109, and has a closure casing therein 110. Between the parts 109 and 110 there is a diaphragm chamber 111 which receives the liquid through the valve 116 for the purpose of operating the brine valve to close it. After the valve has been operated to close it and the pressure has been released, the liquid in the chamber 111 passes out through a bleed 112, thereby relieving the pressure from the diaphragm and permitting the spring 106 to open the valve 103, which remains open until more liquid is admitted through the operation of valve 116. 113, as shown in this figure, is the end of a drain pipe, and is the termination of the pipe 60 which leads from the meter. The purpose of this pipe 60 and the drain 113 is to remove the pressure from the valves after the ball valve 54 is seated, after being opened by the operation of the cams and the bell crank levers.

Remote from the bleed 112, in this part of the casing, is a chamber 114 in which the liquid immediately passes after opening the valve 116. The passage of the liquid into the chamber 114 is controlled by a valve which controls the passageway 117 through a plug member 115 in a partition between chamber 114, associated with the brine valve, and a passageway 119, associated with the refill valve. As the liquid leaves the passageway 119 to go through the passageway 117 it passes through a screen 118.

The numeral 120 is used to designate the diaphragm chamber, associated with the refill valve, and is the chamber in which pressure is built up for the purpose of operating the valve after the liquid has been admitted into the chamber. In this valve the stem is similar to that shown in the brine valve but has on the lower end thereof a valve 121, which is normally closed for the purpose of preventing the passage of liquid from the tubular chamber 100 to the pipe 93, or from the pipe 93 to the tubular chamber 100. Between these two there is a partition 122 which has an opening therein controlled by the valve 121. As the liquid leaves the tubular chamber 101 and passes through the valve it first enters a chamber 123, from which it enters the pipe 93.

Under normal conditions, that is when the valve 54 is closed and no pressure is on any of the diaphragms of the valves, valve 121 is closed and valve 103 is open, but for the purpose of locking the valve 121 open, though there be no pressure on the diaphragm thereof, there is provided a plunger 124 which is normally held in outward position by means of a spring 125. This plunger, in certain stages of its operation, engages above a shoulder 105 and holds the valve open until the plunger is withdrawn.

In Figure 5 valve 121 is shown locked open by plunger 124.

For the purpose of withdrawing and operating this plunger there is provided a bell crank lever 126 pivoted to the casing, and one arm of which engages the inner end of the plunger 124 while the other arm has a slot therein through which there extends a pin 127, which fits in a slot 128 formed by two jaws 129 on the upper end of a link 130. By this slot and pin connection there is a free movement, within a limited degree, between this end of the link and its associated part of the bell crank lever 126. The lower end of the link 130 is pivoted at 131 to a lever 134 which is pivoted at one end to the casing 109 and has attached to the other end a spring 135, which is attached to a part of the housing for the purpose of holding the lever 134 in an elevated position so that the link 130 is always in engagement with the pin 127.

Between the point 131 and the pivot of the lever 134 there is pivotally attached to the lever 134 a valve stem 138, which extends upward through a casing therefor and engages the valve ball 116 for the purpose of closing the opening 117 to prevent the passage of liquid from the passage 119 to the casing 114.

For the purpose of operating the bell crank lever 126 there is rigidly attached thereto an arm 136, which has on its outer end a float member 137 which rests upon the brine and moves up and down as the brine is taken from the tank or the brine tank is refilled. When the tank is full and the rod 136 is in substantially horizontal position the plunger 124 is withdrawn so that the shoulder 105, controlled by a spring thereunder, may move up readily to close the valve 121.

While the valves are in this condition no water can pass from the brine valve or to the brine valve, but during the time between the closing of the brine valve 103 and the closing of valve 121 is the period during which the refilling of the brine tank takes place. The course of the water taken during the refilling of the brine tank will be described later on.

While the regeneration action has been taking place, the bell crank lever 126 has been operating plunger 124, which has around it a spring 125 to push the plunger to the lefthand, as shown in Figure 5, so that its outer end will engage over a disk on the refill valve stem and will lock this valve in open position. This valve will stay thus locked open until a sufficient amount of water has been carried into the brine tank to raise the float sufficiently to raise the lever 136 to operate the bell crank lever 126 to withdraw the plunger 124 from behind the disk on the valve stem. When this is done the valve stem is released and the valve is again closed and no more water can pass into the brine tank.

After the valve 103 has been closed and the brine has been shut off, the water still pursues its course, as before defined, through the regenerating tank 1, but cannot draw the brine therewith because the brine valve has been closed, hence the rinsing action which continues until the cams operated by the meter have reached the point where the valve 54 is closed and all of the valves are placed in their former normal positions, where the water is again carried from the meter down to the lower part of tank 1, up through the tank, out through valve 74 to service pipe 75, ready for a repetition of the prior actions.

The hard water is supplied for regenerating and rinsing purposes from the hard water inlet pipe 5, and passes up through pipe 139 to valve 140, as shown in Figure 14, which is a by-pass valve and normally closed so that the hard water must necessarily enter and pass through the meter chamber. On the upper end of rod 145 which carries the valve 140 is the valve 141, which is the same as valve 74 and controls the passage of water from the regenerating tank to the service pipe. The valve 141, the same as valve 74, is normally open for the passage of water to the service line, while the valve 140 is normally closed, but during the time that the valves are in the reverse action from that necessary for softening purposes, the valve 141 is closed to cut off the water from the service line, and the valve 140 is open for the purpose of admitting water from the inlet pipe to the service line.

After the rinsing water has passed through the regeneration tank and the valve 54 has closed so that all of the valves are restored to their normal positions, with the exception of the refill valve 121, the refilling of the brine tank takes place and the water to refill the brine tank takes the following course, a part of which is the same as that taken by the water to be softened.

Immediately after the valve 54 is closed and the pressure is removed from all of the valves and all of the valves are in their normal condition except the refill valve, the hard water enters through pipe 5, passes through the meter casing, out through pipe 68, up through the softening tank 1, through pipe 69, into the U-shaped pipe, where part of the water passes through the branch 71, through casing 73, and out through valve 74 to service pipe 75, but a part of the water also passes through the branch 86 of the U-shaped pipe, through injector opening 91, into chamber 87, through pipe 93, by valve 121, which is yet open, through the tubular chamber 100, through the aperture 102, which is open, through pipe 97 to the brine tank. This course of the water continues until the water in the brine tank becomes sufficiently high that the float 137, with the rod 136, is raised to operate the bell crank 126 to withdraw the plunger 124 from the shoulder 105 of the refill valve. When the water has reached this point and the plunger 124, having been withdrawn from the shoulder 105 of the refill valve, the valve 121 closes, due to the action of the spring which normally holds the valve closed. After the valve 121 is closed no more water can pass therethrough to the brine tank.

At this point all valves are in their normal condition and remain so until the cams that operate the bell crank levers to open valve 54 reach the point where these levers are operated and the valve 54 is opened, at which time the softening ceases and the regeneration and the rinsing positions are brought about, and continue until the whole chain of action just described is completed. All of these changes are brought about by automatic action due to the passing of the water through the meter and the operation of the valve 54 thereby for the control of pressure behind the respective valve diaphragms for opening and closing the different valves.

I desire to comprehend within my invention such modifications as may be clearly embraced within my claims and the scope of my invention.

Having thus fully described my invention, what I claim as new and desire to secure by Letters Patent, is:

1. In a softener, a housing forming a meter chamber, a detachable bottom forming the lower part of said chamber, said bottom having a U-shaped passageway therein connected to said chamber, and valves in said passageway to control the passage of water from said chamber.

2. In combination, in a housing forming a meter chamber, a detachable cup-shaped member forming the bottom part of said chamber, said cup-shaped member having a passageway leading therefrom and extending upward, and a second passageway leading down from the first named passageway, and a valve to control the flow of water through said passageways from said chamber.

3. In combination, in a housing forming a meter chamber, a detachable cup-shaped member forming the bottom part of said chamber, said cup-shaped member having a passageway leading therefrom and extending upward, and a second passageway leading down from the first named passageway, a valve to control the flow of water through said passageways, and means operable by the flow of water through the meter chamber to determine the position of said valve.

4. In combination, in a housing forming a meter chamber, said chamber having an inlet opening and a plurality of outlet passageways, valves to control the passage of water through said outlet passageways, a meter in said meter chamber, and means rotatably mounted in said housing and operated by said meter to determine the positions of said valves.

5. In combination, in a housing forming a meter chamber, said chamber having an inlet opening and a plurality of outlet passageways, a meter in said meter chamber, water pressure operated valves to control the passage of water through said outlet passageways, a pipe leading from said chamber to said valves, and valve means in said pipe operable by said meter to control the flow of water from said pipe to said valves through said pipe.

6. In combination, in a housing forming a meter chamber having an inlet opening and a plurality of outlet passageways, a meter in said chamber, and means operable by said meter to control the flow of water through said outlet passageways, said means including a cam and a valve operated by said cam.

7. In combination, in a housing forming a meter chamber having an inlet opening and a plurality of outlet passageways, a meter in said chamber, valves in said outlet passageways, and means operable by said meter to operate said valves to control the flow of water through said chamber, said means including a pipe from said chamber to said valves, and a cam operated valve in said pipe to control the flow of water from said chamber to said valves to determine the position of said valves.

8. In a water softening apparatus, a housing having a meter chamber therein having an inlet opening and a plurality of outlet passageways, a meter in said chamber, water operated valves in said passageways to control the flow of water through said passageways, and means to control the flow of water to said valves to operate said valves, said means including a chain of gears, a cam operated by said gears, a system of levers operated by said cam, and a valve operated by said levers.

9. In a water softening apparatus, a housing having an inlet pipe and a plurality of outlet passageways, water pressure operated valves to control the flow of water through said passageways, and means for determining the periods of softening and regeneration including a meter, a cam operated by said meter, bell crank levers operated by said cam, and a valve operated by said levers to control the water pressure for operating said valves.

10. In a control mechanism for a softener, in combination with a plurality of water pressure controlled valves, a meter, a chain of gears operated by said meter, an adjustable cam operated by said gears, levers operated by said cam, and a valve operated by said levers to regulate the admission of water pressure to said valves.

In testimony whereof, I affix my signature.

CHARLES P. EISENHAUER.